May 27, 1969 M. AUPHAN ET AL 3,446,073
METHOD OF AND DEVICE FOR THERMALLY MEASURING BLOOD FLOW
Filed July 11, 1966

INVENTORS
MICHEL AUPHAN
JEAN PERILHOU

INVENTORS
MICHEL AUPHAN
JEAN PERILHOU

BY

AGENT

United States Patent Office 3,446,073
Patented May 27, 1969

3,446,073
METHOD OF AND DEVICE FOR THERMALLY MEASURING BLOOD FLOW
Michel Auphan, Neuilly-sur-Seine, and Jean Perilhou, Bourg-la-Reine, France, assignors to North American Philips Company, Inc., New York, N.Y., a corporation of Delaware
Filed July 11, 1966, Ser. No. 568,999
Claims priority, application France, July 28, 1965, 26,311, Patent 1,452,215
Int. Cl. G01f 1/00
U.S. Cl. 73—204   10 Claims

ABSTRACT OF THE DISCLOSURE

A method of and a device for measuring the rate of flow D of a liquid in a channel. An auxiliary liquid of a temperature $T_1$ different than the temperature $T_3$ of the channel liquid is injected into the channel and mixes therewith. The rate of flow $d$ of the auxiliary is determined. The temperature $T_2$ of the mixed liquid is determined. The rate of flow D of the channel liquid is determined from the formula:

$$D = d\frac{T_2 - T_1}{T_3 - T_2}$$

This invention relates to the measurement of the rate of flow of a liquid circulating in a channel which has a more or less regular shape but is difficult to separate, more particularly, to the measurement of the rate of flow of blood in the human body.

The majority of the methods hitherto tested for measuring the rate of flow (volume that passes through a cross-section per unit time) are based on the measurement of the velocity of a liquid for given dimensions of the channel (travelling speed of coloring matter or injected radio-active substance, influencing the rate of propagation of an ultra-acoustic signal by the velocity of the blood, etc.). However, the operation of these methods is not always satisfactory. First of all, because the more or less irregular dimensions of the channel cannot readily be determined and, secondly, because the velocity of a liquid differs at any point of a cross section of a real channel due to the friction of the liquid on the walls.

The present invention mitigates these disadvantages and has for its purpose to measure the rate of flow of a liquid without preliminary determination of its velocity being required.

The liquid to be measured will be referred to as the primary liquid. According to the invention, in order to measure the rate of flow thereof in a channel which is difficult to separate, more particularly, to measure the rate of flow of blood in a blood vessel, use is made of an auxiliary liquid the temperature of which differs from that of the primary liquid. A known volume per unit time of said auxiliary liquid is introduced into the channel. The difference between the temperatures of the mixed liquids and the introduced liquid and also the difference between the temperatures of the primary liquid and the mixed liquids are measured, whereupon the rate of flow is determined from the product of the rate of flow of the introduced liquid and the quotient of said two temperature differences.

In a convenient method for measuring the circulation of blood, the auxiliary liquid is introduced into the blood-circulation channel by means of a hypodermic needle having an outflow aperture at one end. The needle is introduced through the wall of the channel.

According to the invention, a device for measuring the rate of flow of a primary liquid in a channel which is difficult to separate includes a measuring device provided with a hypodermic needle having an outflow aperture. The device also includes means for measuring the rate of flow of an auxiliary liquid flowing out of the needle. The measuring device includes a temperature-sensitive element and at least one other temperature-sensitive element that is arranged in the region occupied by the mixed liquids. Still another temperature-sensitive element is in contact with the primary liquid. There elements are connected to electric current circuits including indicating devices so that the difference between the temperature of the mixed liquids and the auxiliary liquid, and the difference between the temperatures of the primary liquid and the mixed liquids, are indicated.

In order that the invention may be readily carried into effect, several embodiments will now be described in detail, by way of example, with reference to the accompanying diagrammatic drawings, in which.

In order to better understand the principle underlying the invention, the measurement will first be explained, followed by a description of the embodiments.

The problem is to determine the rate of flow D of a primary liquid, for example, blood flowing in a blood vessel. By adding to the primary liquid an auxiliary liquid which can mix with it and which has a known rate of flow $d$, it is possible to determine the rate of flow D if the following temperatures are known:

$T_1$=Temperature of the auxiliary liquid
$T_2$=Temperature of the mixture composed of the auxiliary liquid and the primary liquid
$T_3$=Temperature of the primary liquid The rate of flow D is then given by the relationship:

$$D = d\frac{T_2 - T_1}{T_3 - T_2}$$

This result depends not only upon the accuracy with which the temperatures and the rate of flow $d$ are measured, but also upon the extent to which the two liquids are mixed together.

Figure 1:
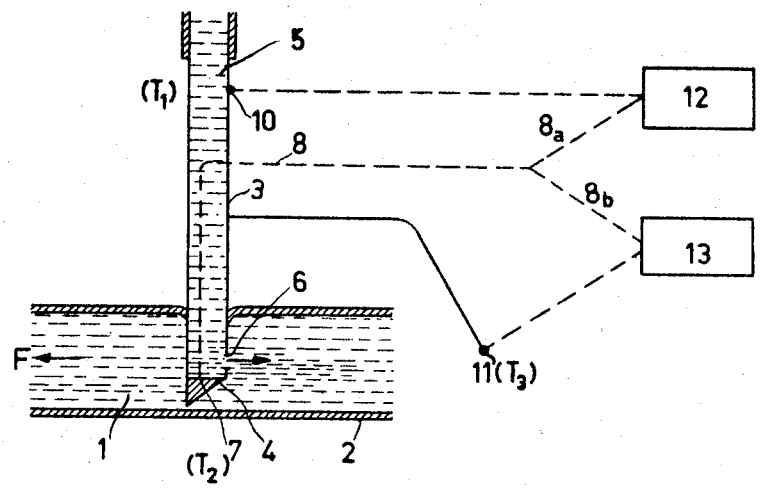
FIGURE 1 shows the device according to the invention in its simplest form.

In the embodiment shown in FIGURE 1, we wish to measure the rate of flow D of the blood or primary liquid 1 that flows through a vessel or channel 2, in the direction indicated by an arrow F. The lower pointed end of a hollow metallic needle 3 penetrates the blood used 2 at substantially right angles.

The needle 3 serves as hypodermic needle by means of which an auxiliaray liquid 5, which can mix with the blood without danger, is introduced into the channel 2. The auxiliary liquid, for example, cooled serum, has a temperature which differs from that of the blood. The wall of the needle has an aperture 6 at the end which is located in the blood path. The serum 5 is injected through said apertures into the blood 1 in a direction opposite to the direction of the blood stream. The serum is mixed with the blood due to the force of the jet. The mixture is taken along by the blood stream and fed back to the needle 3. The temperature $T_2$ of the mixture is measured by means of a thermo-element 7 arranged at the lower end 4 of the needle 3.

The thermo-element 7 is composed of two metals, for example, the metal constituting the needle and the metal of which a wire 8 (shown in broken line) is made. This wire extends through the interior of the needle and is insulated therefrom. The thermo-element 7 is connected in opposition to a thermo-element 10 which is in contact with the serum of a temperature $T_1$, and also is connected in opposition to a thermo-element 11 which is arranged upstream in front of the needle 3, for example, in the rectum, and which is in contact with the blood of a temperature $T_3$. The wire 8 has two branches 8a and 8b. The thermo-element 10 may be composed, similarly to the thermo-element 7, of the metal constituting the needle and the metal of a wire (shown in broken line) similar to the wire 8. The thermo-element 11 is likewise composed of two metals welded together, i.e. the metal constituting the needle and the metal constituting the wire 8. In another embodiment (not shown) the thermo-element 7, connected to the wire 8, may be replaced by two thermo-elements, indicated hereinafter by reference numerals 7 and 9, which are connected in opposition to the thermo-elements 10 and 11, respectively. It will be evident that the thermo-elements must be insulated from the blood since the blood is a conductor constituting an electrical shunt between the thermo-elements.

The two circuits are connected to voltmeters 12 and 13 which indicate the difference between the temperature $T_2-T_1$ and the difference between the temperatures $T_3-T_2$. Further, the rate of flow of the serum is measured with a measuring instrument which is not shown. Knowing these magnitudes it is now possible to determine the rate of flow of the primary liquid from the formula:

$$D = d\frac{T_2-T_1}{T_3-T_2}$$

This calculation may be made automatically by means of a computer which replaces the two voltmeters.

A device of this very simple form can be used only if the requirements imposed upon the accuracy of measurement are not high. The test result thus obtained is correct only approximately because the jet of auxiliary liquid transmits a certain pulse to the primary liquid, causing a certain variation in pressure in the channel diode changes the rate of flow. Complete mixing of the serum and the blood will hardly be possible in view of the short distance between the needle and the point where the mixture is produced.

In order to avoid this interference in the rate of flow, it is possible to provide the needle 3 with a second aperture (not shown) which faces the first aperture.

The device without the voltmeters will be referred to hereinafter as the measuring device.

Figure 2:
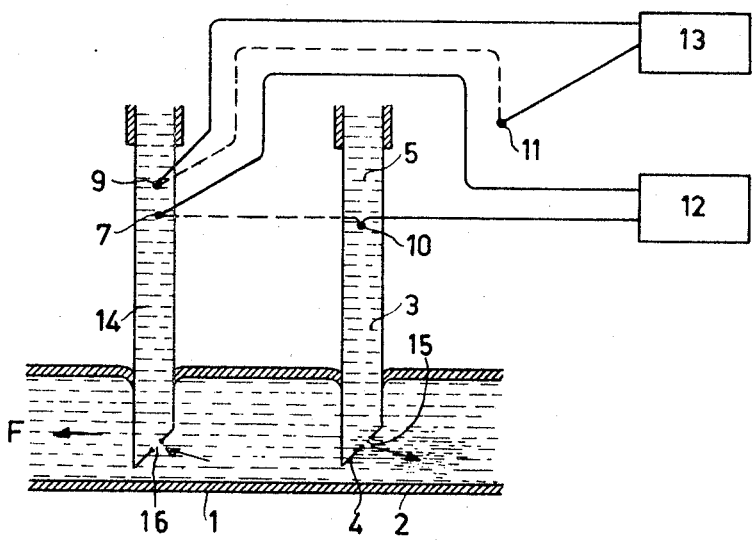
FIGURES 2, 3 and 4 show more elaborate devices according to the invention.

In the measuring device shown in FIGURE 2, a second needle 14 is arranged downstream of the first needle 3. The needle 14 is connected to a pump (not shown) which removes a certain proportion of the serum blood mixture having a temperature $T_2$. A thermo-element is not now present in the lower end 4 of the needle 3. The serum is injected through a central aperture 15 which may be replaced, if desired, by lateral apertures provided in the wall at the lower end of the needle. The needle 14 also has a central aperture 16 through which the mixture is removed. The distance between the two needles depends substantially upon the velocity and the viscosity of the blood and must be chosen so that the two liquids thoroughly mix together in the region in which turbulence occurs due to the injection of the serum. The volume of liquid that is removed through the needle 14 must be equal to the volume injected through the needle 3, thus preventing the occurrence of a counterpressure in front of the needle 3 which would impede the flow of blood. For measuring the temperature $T_2$, the needle 14 contains two thermo-elements 7 and 9 which are connected, as before, in opposition to the thermo-elements 10 and 11 (the latter element being arranged rectally). To measure the temperature $T_3$ with greater accuracy, it is possible to place the thermo-element 11 in closer proximity to the needle 3. In this case the thermo-element 11 may have the form of a needle.

Figure 3:
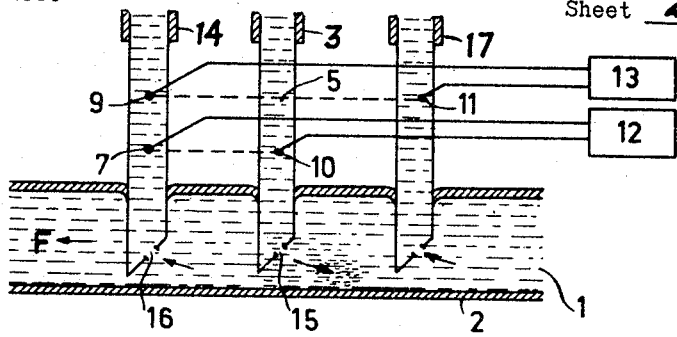

FIGURE 3 shows a device similar to that of FIGURE 2, except that a third needle 17, similar to the needle 14 for the removal of blood, is arranged upstream in front of the needle 3. The needle 17 permits the withdrawal of a little pure blood. The temperature $T_3$ of this blood is measured in a very accurate manner by means of a thermo-element 11 arranged inside the needle 17.

Figure 4:
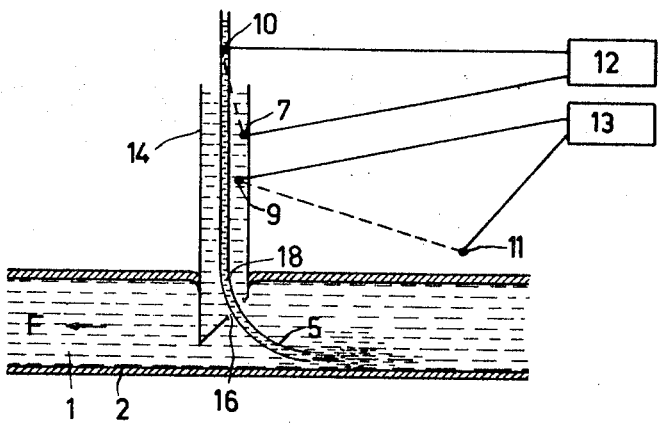

The device shown in FIGURE 4 may be regarded as a particular form of the device of FIGURE 2. The measuring device comprises a single needle 14 for the removal of blood or liquid. The needle for injecting the auxiliary liquid is replaced by a flexible tube 18, for example, of synthetic material. The tube 18 is introduced into the needle 14 before the insertion in the blood path 2 and, after insertion, is slipped out through an aperture in the wall of the needle. As soon as the flexible tube contacts the inner wall of the blood vessel 2, it is bent over and engages along the blood path in a direction opposite to the direction of flow. When the tube has been introduced into the blood path over a sufficient length, the serum 5 is injected through the tube and mixes with the blood. The blood is withdrawn through an aperture 16 of the needle 14 through which the tube 18 extends. The temperatures are measured in a similar manner to that described for the device of FIGURE 2.

After the measurement is terminated, the tube 18 is pulled back into the needle 14 before removing the needle from the blood vessel.

Figure 5:
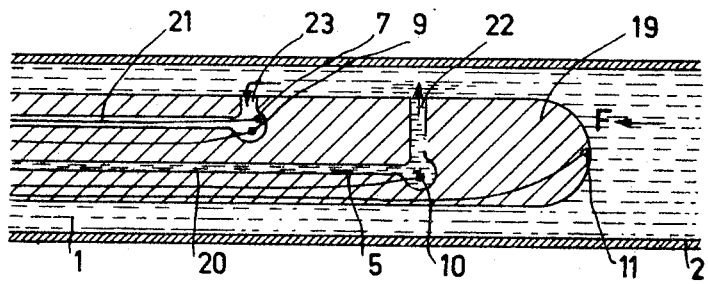
FIGURE 5 shows a device according to the invention including a catheter.

The measuring device shown in FIGURE 5 comprises a catheter 19 which is placed within the blood path 2 and in parallel therewith. The catheter comprises two parallel horizontal tubes 20 and 21 which are connected to devices for the injection and removal of liquid (not shown). The tubes terminate in perpendicular channels 22 and 23, which end in the blood path at right angles to the direction of flow. The serum is injected through the tube 20 and the channel 22 and removed through the channel 23 and the tube 21. The thermo-elements 7 and 9 are arranged inside the tube 21, the thermo-element 10 inside the tube 20 and the thermo-element 11 within the head of the catheter. As before, the thermo-elements are connected to the circuits (not shown in FIGURE 5) in the manner already explained.

The invention is not limited to the embodiments described and modifications can be made within the scope of the invention. More particularly, the thermo-elements can be replaced by other temperature-sensitive elements which provide the data relating to the temperature differences, or possibly the temperatures themselves, for use in a computing member. The needles can be combined to form a unit.

What is claimed is:

1. A method of measuring the rate of flow of a liquid flowing through a channel comprising, introducing into said channel an auxiliary liquid at a known rate of flow and at a temperature that differs from that of the primary liquid, determining the difference between the temperature of the mixed liquids and the auxiliary liquid and the difference between the temperature of the primary liquid and the mixed liquids, and determining the rate of flow of said liquid by taking the product of the rate of flow of the auxiliary liquid and the quotient of said two temperature differences.

2. A method as claimed in claim 1, wherein said auxiliary liquid is introduced into a blood-circulation channel through a wall of the channel by means of a hypodermic needle having an exit aperture at one end for said auxiliary liquid.

3. A device for measuring the rate of flow of a liquid in a channel comprising, a hypodermic needle having an outflow aperture adapted to be introduced into said channel, means supplying an auxiliary liquid to said needle at a temperature that is different than the temperature of the channel liquid, means for measuring the rate of flow of said auxiliary liquid flowing out of said aperature, a first temperature-sensitive element arranged to sense the temperature of said auxiliary liquid, a second temperature-sensitive element arranged in the region occupied by the mixed liquids for sensing the temperature thereof, a third temperature-sensitive element arranged to sense the temperature of the channel liquid, and means connecting said elements to an electrical indicating device that measures the difference between the temperatures of the mixed liquids and the auxiliary liquid and the difference between the temperatures of the channel liquid and the mixed liquids.

4. A device as claimed in claim 3 in which the hypodermic needle is arranged to penetrate the channel in a substantially perpendicular direction and has at least one lateral aperture at the end which is present in the channel, said needle being arranged so that the auxiliary liquid is injected into the channel via said aperture in a direction opposite to the direction of flow of the channel liquid, the temperature-sensitive elements comprising, a first set of two oppositely connected thermo-elements arranged respectively in the channel at the level of the lower end of the hypodermic needle and inside the hypodermic needle, and a second set of two oppositely connected thermo-elements arranged respectively in the channel upstream in front of the hypodermic needle and at the level of the lower end of the hypodermic needle.

5. A device as claimed in claim 3 further comprising a first outlet tube arranged in the channel downstream from the hypodermic needle, that end of the tube which lies in the channel having an aperture through which at least a certain volume of the mixed liquids is removed from the channel, said second temperature-sensitive element comprising two temperature sensing elements placed in the outlet tube, said first temperature-sensitive element being positioned in the hypodermic needle and the third temperature-sensitive element being placed in the channel upstream in front of the hypodermic needle.

6. A device as claimed in claim 3 further comprising a second outlet tube arranged in the channel upstream in front of the hypodermic needle, that end of the second tube which is located in the channel having an aperture through which a certain portion of the channel liquid is removed, said third temperature-sensitive element being located within said second tube.

7. A device as claimed in claim 3 further comprising a flexible tube that extends through the needle and out of the aperture so that it extends into the channel upstream, said auxiliary liquid being supplied to said flexible tube.

8. A device as claimed in claim 7 wherein said first temperature-sensitive element is located within said flexible tube and said second temperature-sensitive element is located within said needle.

9. A device for measuring the rate of flow of a liquid in a channel comprising, a catheter adapted to be located in the channel in the direction of flow of said liquid, said catheter containing first and second conduits adapted to extend into the channel at longitudinally spaced positions and at right angles to the direction of flow of said channel liquid, means supplying an auxiliary liquid to the upstream conduit at a temperature that is different than the temperature of the channel liquid, means for measuring the rate of flow of said auxiliary liquid, a first thermo-sensitive element located within said upstream conduit for sensing the temperature $T_1$ of the auxiliary liquid, a second thermo-sensitive element located within the downstream conduit for sensing the temperature $T_2$ of the mixed liquids, a third thermo-sensitive element positioned upstream from said upstream conduit and arranged to sense the temperature $T_3$ of the channel liquid, and means connecting said first, second and third elements to an electrical device that measures the temperature difference $T_2-T_1$ and the temperature difference $T_3-T_2$.

10. A device as claimed in claim 9 wherein said third thermo-sensitive element is mounted at the front end of said catheter.

References Cited

UNITED STATES PATENTS

| | | | |
|---|---|---|---|
| 3,075,515 | 1/1963 | Richards | 128—2.05 |
| 3,312,106 | 4/1967 | Davis | 128—2.05 X |
| 3,359,974 | 12/1967 | Khalil | 128—2.05 |

OTHER REFERENCES

Katsura et al.: Isothermal Blood Flow Velocity Probe, IRE Transactions on Medical Electronics, 1959, pp. 283–285.

RICHARD C. QUEISSER, *Primary Examiner.*

E. GILHOOLY, *Assistant Examiner.*

U.S. Cl. X.R.

73—196; 128—2.05

PO-1050
(5/69)

UNITED STATES PATENT OFFICE
CERTIFICATE OF CORRECTION

Patent No. 3,446,073          Dated May 27, 1969

Inventor(s) MICHEL AUPHAN ET AL

It is certified that error appears in the above-identified patent and that said Letters Patent are hereby corrected as shown below:

Column 2, line 51, cancel "used" and insert -- vessel --;

Column 3, line 37, cancel "diode" and insert -- which --;

Signed and sealed this 16th day June 1970.

(SEAL)
Attest:

EDWARD M. FLETCHER, JR.          WILLIAM E. SCHUYLER, JR.
Attesting Officer                Commissioner of Patents